United States Patent
Kim et al.

(10) Patent No.: US 7,117,423 B2
(45) Date of Patent: Oct. 3, 2006

(54) METHODS AND SYSTEMS FOR MULTIPLE SUBSTREAM UNEQUAL ERROR PROTECTION AND ERROR CONCEALMENT

(75) Inventors: Joohee Kim, Atlanta, GA (US); Russell M. Mersereau, Atlanta, GA (US); Yucel Altunbasak, Norcross, GA (US)

(73) Assignee: Georgia Tech Research Corp., Atlanta, GA (US)

( * ) Notice: Subject to any disclaimer, the term of this patent is extended or adjusted under 35 U.S.C. 154(b) by 669 days.

(21) Appl. No.: 10/423,846

(22) Filed: Apr. 24, 2003

(65) Prior Publication Data

US 2003/0229822 A1   Dec. 11, 2003

Related U.S. Application Data

(60) Provisional application No. 60/375,235, filed on Apr. 24, 2002.

(51) Int. Cl.
*H03M 13/35* (2006.01)
*H04L 1/02* (2006.01)

(52) U.S. Cl. ............. 714/774; 370/436; 370/437; 714/820; 714/821

(58) Field of Classification Search ............. 714/774, 714/820–821; 370/436–437; H03M 13/35
See application file for complete search history.

(56) References Cited

U.S. PATENT DOCUMENTS

2004/0194008 A1* 9/2004 Garudadri et al. .......... 714/821

OTHER PUBLICATIONS

Seshadri et al.; Coded modulation with time diversity, unequal error protection, and low delay for the Rayleigh fading channel; Universal Personal Communications, 1992 Proceedings., 1st International Conference on: Sep. 29, 1992; pp. 11.01/1-11.01/5.*

A. Mohr, E. Riskin, and R. Ladner, "Unequal loss protection: graceful degradation of image quality over packet erasure channel through forward error correction," IEEE Journal on Sel. Areas in Commun., Voc. 18, No. 6, pp. 819-828, Jun. 2000.

C. Creusere, "A new method of robust image compression based on the embedded zerotree wavelet algorithm," IEEE Trans. on Image Processing, vol. 6, No. 10, pp. 1436-1442, Oct. 1997.

(Continued)

*Primary Examiner*—R. Stephen Dildine
(74) *Attorney, Agent, or Firm*—Nora M. Tocups, Esq.

(57) ABSTRACT

Methods and systems for streaming data in a network. Whether the network is experiencing high packet loss may be determined by a rate control module. If high packet loss is experienced, data is encoded into multiple streams by a coder using temporal domain partitioning. If high packet loss is not experienced, then data may is encoded by using frequency domain partitioning. Unequal error protection is applied to each of the streams so more important bit planes in a bit of a stream are provided with more error protection than less important bit planes. The streams are transmitted along, respectively, independent paths to a decoder. The streams are decoded, and errors in the decoded streams are corrected by using information from one or more of the other decoded streams. The decoded corrected streams are reconstructed into the data.

9 Claims, 5 Drawing Sheets

OTHER PUBLICATIONS

A. Albanese, J. Biomer, J. Edmunds, M. Luby, and M. Sudan, "Priority encoding transmission," IEEE Trans. on Inform. Theory, vol. 42, pp. 1737-1744, Nov. 1996.

A. A. Alatan, M. Zhao, and A.N. Akansu, "Unequal Protection of SPIHT Encoded Image Bit Streams," IEEE Journal on Sel. Areas in Commun., vol. 18, No. 6, pp. 814-818, Jun. 2000.

A. Mohr, E. Riskin, and R. Ladner, "Approximately optimal assignment for unequal loss protection," in Proceedings of ICIP '00, Oct. 2000.

K-W Lee, R. Puri, T. Kim, K. Ramchandran, and V. Bharghavan, "An integrated source and congestion control framework video streaming in the internet," in Proceedings of INFOCOM 2000, Apr. 2000.

A. Said and W. Pearlman, "A New, fast, and efficient image codec based on set partitioning in hierarchical trees," IEEE Trans. on Circuits Syst. Video Technol., vol. 6, pp. 243-250, Jun. 1996.

Y. Wang and Q.F. Zhu, "Error control and concealment for video communications: A review," IEEE Proceedings, vol. 86, pp. 974-997, May 1998.

B.J. Kim, Z. Xiong, and W.A. Pearlman, "Low bit-rate scalable video coding with 3-D set partitioning in hierarchical trees (3-D SPIHT)," IEEE Trans. on Circuits Syst. Video Technol., vol. 10, No. 8, pp. 1374-1387, Dec. 2000.

Shantanu D. Rane, Jeramiah Remus, and Guillermo Sapiro, "Wavelet-domain reconstruction of lost blocks in wireless image transmission and packet-switched networks," IEEE ICIP 2002, pp. 309-312.

Vinay Chande, "Progressive transmission of images over memoryless noisy channels," IEEE Journal on Sel. Areas in Commun., vol. 18, No. 6, pp. 850-860, Jun. 2000.

John G. Apostolopoulos, "Reliable video communication over lossy packet networks using multiple state encoding and path diversity" Visual Communications and Image Processing, Jan. 2001.

John G. Apostolopoulos, Tina Wong, Wai-tian Tan, and Susie Wee, "On multiple description streaming with content delivery networks," IEEE INFOCOM Proceedings, pp. 1-10, Jun. 2002.

\* cited by examiner

METHODS AND SYSTEMS FOR MULTIPLE SUBSTREAM UNEQUAL ERROR PROTECTION AND ERROR CONCEALMENT

CROSS-REFERENCE TO RELATED APPLICATION

The present application claims priority to and benefit of the prior filed and commonly owned provisional application, filed in the United States Patent and Trademark Office on Apr. 24, 2002, assigned application Ser. No. 60/375,235, and incorporated herein by reference.

FIELD OF THE INVENTIONS

The inventions relate in general to the field of video transmission. The inventions relate in particular to error protection and error concealment in hostile network environments with respect to the field of video transmission. Even more particularly, the inventions relate to the field of utilizing multiple sub-streams, unequal error protection algorithms, and error concealment in hostile network environments to provide video transmission.

BACKGROUND

Video streaming over reliable channels has become commonplace. Challenging technical problems, however, remain to be solved in order to consistently support video streaming over unreliable channels such as channels having high loss rates. It can be difficult to provide a reasonable quality of service at high loss rates because, typically, video streaming applications are designed to operate in low loss environments. Therefore, many video streaming applications are not exceptionally error-resilient nor network adaptive in high loss environments like wireless networks.

In low loss environments, it is relatively simple to correct or retrieve information lost in the process of video streaming. The easiest and most common method to retrieve lost data is to simply send a message from the receiver to the transmitter requesting the lost information, and then to have the transmitter transmit the requested information to the receiver. Of course, sending the message from the receiver to the transmitter and transmitting the requested information from the transmitter to the receiver takes time.

The time required to execute the easy method of information exchange between the receiver and transmitter described above is what makes the easy method unattractive for use in high loss environments. High loss environments do not have the extra time to carry out the easy method. Wireless and other high loss environments are often utilized for "live" event broadcasts, and such broadcasts may be transmitted over a considerable distance. Accordingly, any additional delay between the transmitter and the receiver in a high loss environment can add or add to choppiness to the video broadcast. Thus, sending a message from the transmitter to the receiver requesting lost information and having the requested information transmitted to the receiver generally is not an option for retrieving lost information in a high loss environment.

To improve video broadcast where video streaming occurs in high loss environments, efforts have been made to minimize information loss by error control on the transmission side of the environment. For example, attention may be given to using appropriate video coding algorithms as part of error control. Unfortunately, most of the current video coding algorithms were developed for relatively error-free environments. High loss environments are often considered unreliable because of high error rates and highly variable load capacities. Thus, the current video coding algorithms are generally not particularly useful in high loss environments.

A constraint on error control at the transmission side of high loss environments has been addressed briefly above in the discussion of the problems associated with the use of the easy method to retrieve lost information in high loss environments. Delay in transmission of information between the transmitter and receiver in a high loss environment can add or add to choppiness of the video broadcast. For example, many wireless video streaming applications are highly sensitive to end-to-end delay. Thus, stringent delay requirements constrain any error control strategy for high loss environments.

An attempted solution to the problems of high loss environments and video streaming's sensitivity to end-to-end delay includes forward error correction (FEC). FEC allows a user to address a potential transmission problem prior to transmitting the data. FEC provides coding that serves as extra protection for the transmitted information. The provision of extra coding, however, can be a complex and time consuming endeavor. Moreover, the extra coding may cause the use of much more bandwidth than without the extra coding.

A popular method of FEC that addresses the issue of conserving bandwidth is termed unequal error protection (UEP). In sum, the more important bits of the bitstream are protected using a stronger FEC code than the less important bits.

More particularly, commonly used video compression algorithms produce bits that contribute quite differently to reconstructed picture quality. Not all of the transmitted bits in a compressed video sequence have equal importance. The theory of UEP is that the more important bits of the transmitted video are protected at a higher level than the less important information.

A limitation of UEP, however, is that it may introduce delay that does not meet the restraints imposed by the stringent end-to-end delay requirements in high loss environments. UEP may introduce delay by its employment of complex algorithms to determine what level of protection is necessary to protect the varying bits of the bitstream. The use of the complex algorithms introduces delay.

More particularly, in the previously proposed UEP, the bitstream is divided into a large number of data fragments according to the importance of the bits. A different FEC code may be assigned to each data fragment. Finding the optimal FEC code for each of the data fragments may take a relatively long time. Thus, delay is introduced. Further, a large number of different FEC codes may be generated and a large amount of overhead information may be sent to the decoder for FED decoding. Although UEP algorithm provide finer quality levels, the UEP algorithms require long execution times to find the optimal FEC codes. This large amount of information and long execution times introduce delay. Given the stringent requirements in high loss environments, the introduced delay may be too much and render use of UEP inappropriate in high loss environments.

A category of methods utilized to reduce the effect of errors in high loss environments is referred to as multi-substream partitioning, which may include multi-substream frequency domain partitioning. Multi-substream frequency domain partitioning has been utilized for wavelet-based coders. In multi-substream frequency domain partitioning, the coefficients of wavelet transforms in a group of pictures (GOP) are divided into several groups, and each group is independently encoded. Each substream is protected using a UEP method and transmitted to a receiver. Thus, errors in one substream do not affect the other substreams.

Once the substreams are decoded, the receiver reconstructs the image from the several descriptions provided by the substreams. Therefore, a missing bit in one substream is not catastrophic because information from one or more of the other substreams may be used to estimate the lost bit.

An advantage of multi-stream frequency domain partitioning is that it has high source coding efficiency. A disadvantage, however, is that correlation between the substreams in multi-stream frequency domain partitioning is not high. Yet, a high correlation between substreams is important to the recovery of lost information at the receiver. Thus, the lack of high correlation in multi-stream frequency domain partitioning argues against its use in high loss environments despite its high efficiency in source coding.

Another method to reduce the effect of errors in a high loss environment is referred to as multi-path transmission. Multi-path transmission allows multiple substreams to be transmitted, respectively, across independent paths. Accordingly, delay or high loss rate in one path does not affect a substream transmitted over a different path. Multi-path transmission is utilized primarily within the moving pictures experts group (MPEG) community.

Advantageously, the methods of multi-substream partitioning and multi-path transmission may be combined. For example, substreams may be transmitted in respective independent paths to the receiver. One of the substreams encounters a high level of loss during the transmission. Another substream encounters the least loss of the transmitted substreams. The receiver may utilize the substream with the least loss to estimate lost bits in a substream that encountered the high level of loss.

Unfortunately, utilizing the methods of multi-substream partitioning and multi-path transmission, especially in the MPEG community, may add unacceptable levels of delay. The delay may be caused by use of relatively complex algorithms in the methods. Additionally, these methods may require transmitting a large amount of additional information to the receiver, which may add to bandwidth usage and also cause delay.

In the receiver side of a high loss environment, methods of error concealment have been used to reduce the effect of errors, and such methods have been used especially by the MPEG community. Error concealment utilizes the fact that most images are smooth to estimate lost bits within a substream. Additionally, error concealment uses one substream of two or more substreams to estimate lost bits in a different substream. A drawback to error concealment is that use of such methods of error reduction, especially with MPEG transmission, often involve the use of algorithms that may be complex, require a lot of information, and time consuming in operation. Thus, the methods of error concealment also may cause more delay than acceptable for video streaming in a high loss environment.

In sum, a need exists for methods and systems that address the drawbacks of video streaming in high loss environments. Methods and systems are needed that provide error-resilient and network adaptive video streaming. Additionally, the methods and systems must efficiently and rapidly protect a bitstream prior to transmission without requiring more bandwidth than necessary. Finally, there is a need for the development of methods and systems that provide efficient error concealment once a transmission through a high loss environment is received.

SUMMARY OF THE INVENTIONS

The inventions provide error-resilient and network adaptive data streaming. Advantageously, the inventions efficiently and rapidly protect data prior to its transmission in a network and accomplish such protection without unnecessarily increasing bandwidth. The inventions also provide for error correction after the transmission of the data through a high loss environment so as enhance reconstructed data quality.

Exemplary embodiments of the inventions include methods and systems for streaming data in a network. Prior to any data streaming taking place, a determination may be made as to whether the network is experiencing a high packet loss. The information relating to and/or the determination may be carried out by a rate control module. The rate control module may provide the information and/or the determination to a coder (also referred to as a "source coder").

If the network is experiencing high packet loss, then the data may be encoded by the coder into multiple streams by using temporal domain partitioning. In a high packet loss environment, temporal domain partitioning is utilized because temporal domain partitioning allows for a higher level of correlation between data streams. A higher level of correlation between data streams provides better error correction or estimation through the use of error concealment techniques.

If the network is not experiencing high packet loss, then the coder may encode the data into multiple streams by using frequency domain partitioning. Frequency domain partitioning is used when the network is not experiencing high packet loss because frequency domain partitioning can save bandwidth. The bandwidth savings come about by the better source coding and compression efficiency of frequency domain partitioning versus temporal domain partitioning.

Advantageously, through the action of determining whether to use either temporal domain partitioning or frequency domain embodiment depending on the network's packet loss status, the exemplary embodiment allows for error-resilient and network adaptive data streaming.

Still referring to the exemplary embodiment, after the encoding of the data into streams, unequal error protection may be applied by an unequal error protection module to each of the multiple encoded streams. Particularly, unequal error protection may be applied with reference to the bit planes of the bits constituting each data stream. The most important bit plane in a bit is accorded the most error protection. Generally stated, error protection may be applied in a hierarchical manner so as to correspond to the hierarchy of importance of the bit planes of the bit. In other words, the more important the bit plane in a bit, the more error protection is applied to it.

After error protection is applied, the multiple encoded streams are transmitted, respectively, along independent paths through the network to a decoder. Using multiple paths allows for faster transmission. In addition, using independent paths allows for differences in the errors or losses suffered by the respective multiple encoded streams. Some of the encoded streams will suffer less loss than others as they are transmitted through the network. The encoded stream or streams with the least errors or losses after transmission may be used with the other streams to reconstruct the data so as its minimize overall distortion resulting from being transmitted through a high loss network.

After transmission through the network, the multiple transmitted encoded streams may be decoded by a decoder into decoded streams. An error or errors incurred during transmission in at least one of the decoded streams may be corrected by an error module by using information from another one or more of the decoded streams. After correction, the data is reconstructed for use by using the decoded corrected streams.

The advantages of the inventions may be more clearly understood and appreciated from a review of the following detailed description of exemplary embodiments and by reference to the appended drawings and claims.

DETAILED DESCRIPTION

The following detailed description utilizes a number of acronyms that are generally well known in the art. Although definitions are typically provided with the first instance of each acronym, for convenience, Table 1 below provides a list of the acronyms and abbreviations used herein along with their respective definitions.

TABLE 1

| ACRONYM | DEFINITION |
| --- | --- |
| FEC | Forward Error Correction |
| GOP | Group Of Frames or Group Of Pictures |
| HLE | High Loss Environment |
| MPEG | Moving Pictures Experts Group |
| PSNR | Peak Signal to Noise Ratio |
| SPIHT | Set Partitioning In Hierarchical Trees |
| UEP | Unequal Error Protection |

The inventions combine and utilize three previously independent methods and systems for increasing error-resiliency when transmitting information in high-loss and/or error-prone environments. Error-resiliency is a measure of resistance to errors. The higher the error-resiliency—the higher the resistance to errors. By providing dynamic adaptability and interchangeability of the methods, the inventions provide for greater error-resiliency than any of the methods alone and greatly compensate for the drawbacks of each method.

Advantageously, the inventions combine unequal error protection, multi-substream partitioning with multi-path transmission, and error concealment. The inventions may be used with wavelet based coders. Moreover, the inventions are dynamically adaptable to the status of a network so as to most efficiently increase error-resiliency. Specifically, the inventions allow for dynamically selecting between temporal or frequency domain partitioning based on the rapid changing conditions of the network environment.

Figure 1:
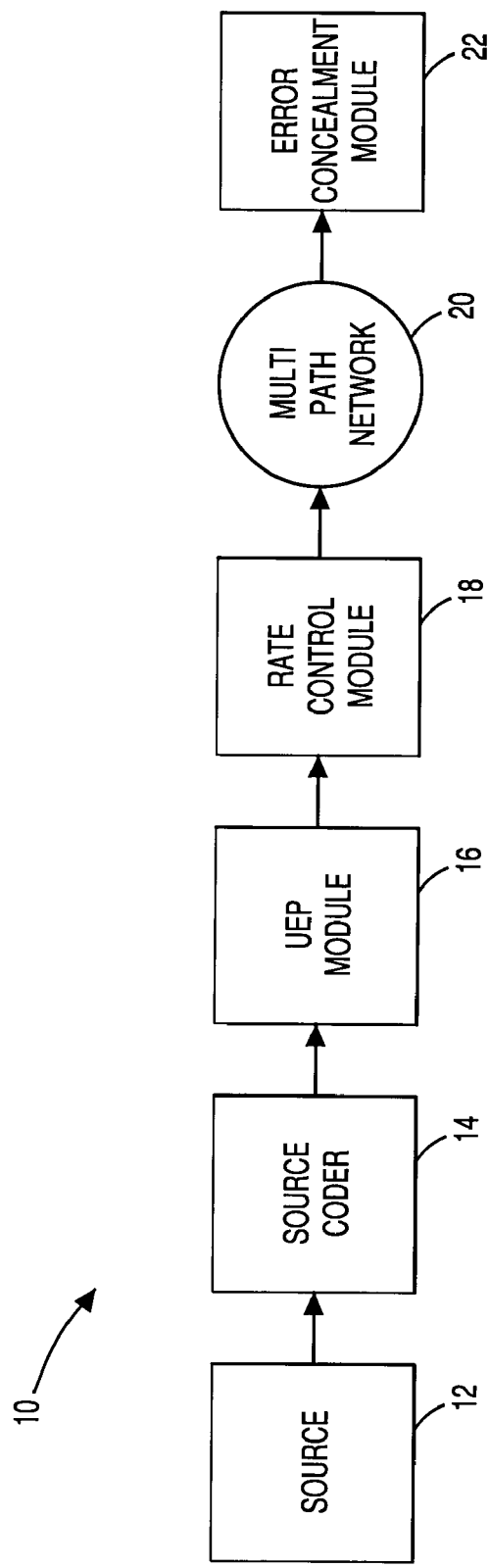
FIG. 1 is a block diagram of an exemplary embodiment of the inventions.

An Exemplary Embodiment—FIG. 1

FIG. 1 illustrates a block diagram of an exemplary embodiment 10 of the inventions. Data such as streaming video or other information may be transmitted through a high-loss or error-prone environment (HLE). For example, an HLE may be a wireless network. The data may be secured or produced by a source 12. Source 12 may be any device capable of securing or producing the data by capturing, storing, producing, and/or transmitting the data. For example, a source 12 may be a video camera, television, security camera, web camera, monitor, computer, etc.

Source 12 may be associated with a source coder 14 (also referred to as "coder"). A source coder 14, which may be within or without the source 12, may receive the data provided by source 12. Generally, the source coder 14 is responsible for preparing the data for transmission over the HLE 10.

In an exemplary embodiment of the inventions, a source coder 14 may be wavelet based. Wavelet based coders are favored over moving pictures experts group (MPEG) based coders because wavelet based coders allow for convenient bit-rate adaptation in time-varying networks.

An example of a source coder 14 constitutes or makes use of a 3-D set partitioning in hierarchical trees (3-D SPIHT) algorithm to prepare the data for transmission across an HLE 10 such as a wireless network. Preparation of the data by the source coder 14 may include creating multiple streams from the data provided by source 12 (as discussed further in relation to FIGS. 3 and 4). A "stream" also may be referred to as a bitstream. Creating the multiple streams from the data may also be referred to as partitioning or encoding. Another alternative in nomenclature is that the data may be referred to as a "stream", and the multiple streams may be referred to as multiple "substreams".

A source coder 14 may also be associated with an unequal error protection module (UEP module) 16. A UEP module 16 may be or make use of an algorithm or software or hardware responsible for providing UEP. In the exemplary embodiment, the UEP module 16 assigns a different amount of redundancy or forward error correction (FEC) coding to each bit-plane of the multiple progressive bitstreams generated by the source coder 14.

The bitstreams are considered progressive because the first bit plane contains the most important data and each successive bit plane contains less important data than the preceding bit-plane. The progressive bitstreams (hereafter simply referred to as bitstreams or streams) are assigned FEC coding so that the level of error-resilience applied to the bit planes is a function of the level of importance of the data within the particular bitstream. For example, typically, the most important bit plane in a bitstream is the first bit plane and the least important bit plane is the last bit plane. Therefore, the first bit plane of each bitstream would be provided with the highest level of redundancy and thus the highest level of error-resilience, and the last bit plane would be provided the least error resilience.

In current UEP algorithms that generate finer quality levels, the UEP algorithms are not applied to bit planes. Instead, the bitstream is divided into a large number of data fragments according to the importance of the bits and a different FEC code is assigned to each data fragment. Therefore, a large number of different FEC codes are generated and a large amount of overhead information is sent to the decoder for FEC decoding. Consequently, current UEP algorithms require long execution times and more complex algorithms. Long execution times and complex algorithms may cause unacceptable delay with respect to high loss environments.

Referring again to the exemplary embodiment discussed in connection with FIG. 1, the UEP module 16 may be used to determine the amount of redundancy in error protection necessary to provide the appropriate error-resiliency. The UEP module may make such a determination by attempting to maximize the overall expected quality at the receiver. In estimating the overall distortion at the receiver, the UEP module 16 may use the expected peak signal to noise ratio (PSNR) obtained from source rate distortion and packet loss models.

Still referring to FIG. 1, a rate control module 18 may be associated with a UEP module 16 to monitor the multi-path network 20. In an alternative embodiment, the rate control module may be associated with the source coder 14 to monitor the multi-path network. The rate control module 18 may be used to monitor the volatility and noise of the channels (also referred to as "paths") within the multi-path network 20. The rate control module 18 may provide up-to-date information regarding the condition or status of the multi-path network to the UEP module 16 and/or the source coder 14. The rate control module 18 may provide the status information to the source coder 14 to allow the source coder 14 to decide on what type of partitioning to use in connection with the encoding of the data into streams. The source coder 14 may have a choice between temporal or frequency domainpartitioning (discussed further in relation to FIGS. 3 and 4). In an alternative embodiment, the rate control module 18 may be used to decide or to provide information to the source coder 14 whether to utilize other types of partitioning such as spatial domain partitioning.

Continuing with reference to FIG. 1, the data may be transmitted across the channels within the multi-path network 20. The multi-path network 20 may consist of two or more independent channels, also referred to as paths. Some of the paths may be independent in that an independent path does not overlap with any other path through the multi-path network 20.

The number of paths in the multi-path network 20 may vary depending on the number of streams that may be generated by the source coder 14. The number of paths in the multi-path network 20 may be equal to or greater than the number of streams that may be generated by the source coder 14. Therefore, each stream may be associated with an independent path within the multi-path network 20. In an alternative embodiment, the multi-path network 20 may simply have greater than one path regardless of the number of streams that may be generated by the source coder 14.

Turning again to FIG. 1, the multi-path network 20 may be associated with an error concealment module 22. The error concealment module 22 may be utilized to restore, recreate and/or estimate missing information such as bit plane values lost from the streams during the transmission of streams across the channels of the multi-path network 20. In the exemplary embodiment, the error concealment module 22 reconstructs the missing bit planes in order beginning with the most important missing bit plane and ending with the least important missing bit plane.

In reconstructing the lost bit planes, the error concealment module 22 utilizes the correlation between the multiple streams to estimate the lost bit plane or planes of a stream. The higher the correlation between the streams, the better the error concealment module 22 functions. Therefore, the error concealment module 22 is most effective when receiving multiple streams that are highly correlated. Moreover, the error concealment module 22 attempts to estimate the missing bit planes in a manner that minimizes the actual overall distortion at the receiver.

Figure 2:
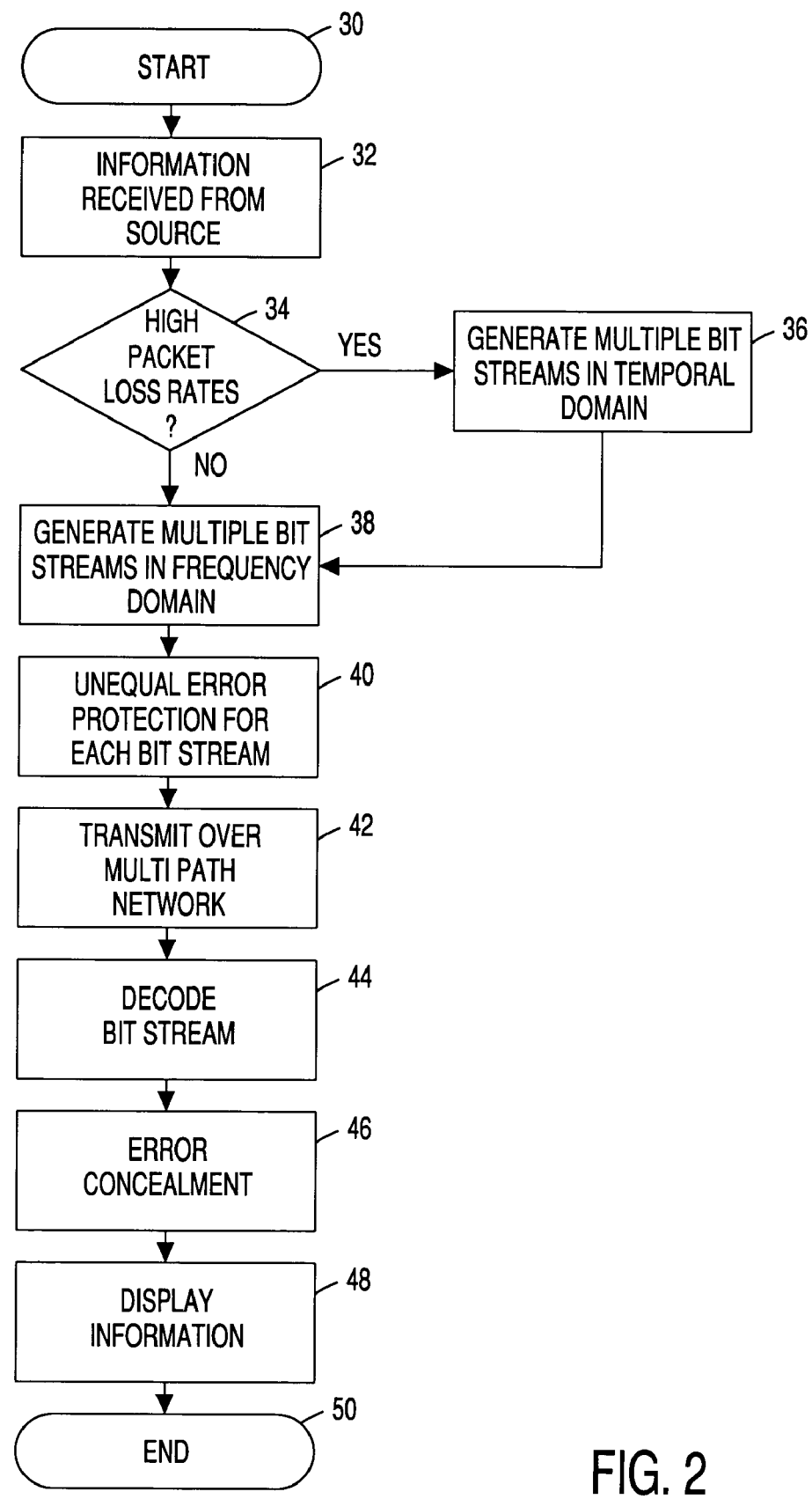
FIG. 2 is a flow diagram of the actions taken by an exemplary embodiment of the inventions.

A Flow Diagram of an Exemplary Embodiment—FIG. 2

A flow diagram of another exemplary embodiment of the inventions is illustrated in FIG. 2. After start 30, the data (also referred to as "information" in FIG. 2) is received (or generated) in action 32. The information may visual information such as a person giving a speech, a live soccer game, etc.

Once the visual information is received, a determination is made as to whether or not the multi-path network is experiencing high packet loss rates, in action 34. If the multi-path network is experiencing high packet loss rates, then the multiple streams are generated utilizing temporal domain partitioning in action 36 (as discussed further in relation to FIG. 3). In a high packet loss environment, temporal domain partitioning is utilized over frequency domain partitioning because temporal domain partitioning provides better error-concealment performance by providing a higher level of correlation between bitstreams.

Figure 4:
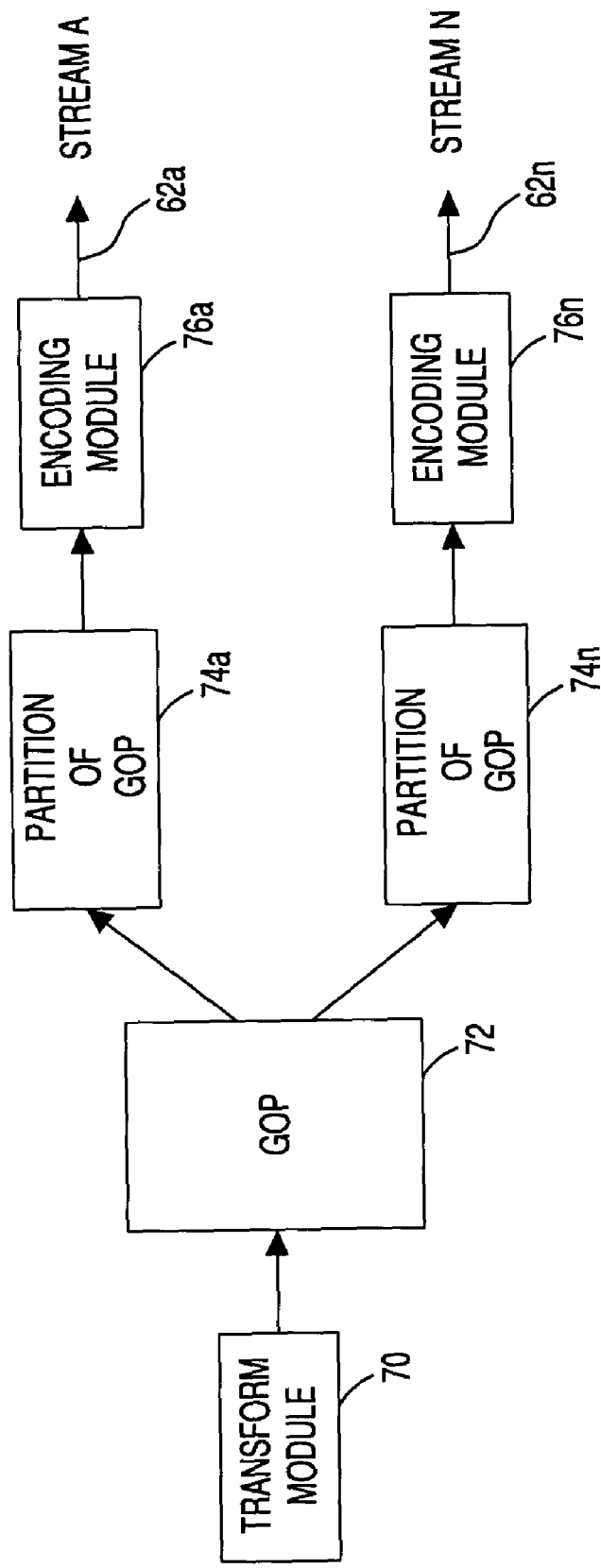
FIG. 4 is a block diagram of an exemplary embodiment of frequency domain partitioning according to the inventions.

Alternatively, if the multi-path network is not experiencing high packet loss rates, then the multiple streams are generated utilizing frequency domain partitioning in action 38 (as discussed further in relation to FIG. 4). Frequency domain partitioning is utilized when the network is not experiencing high packet loss rates because frequency domain partitioning provides better source coding and compression efficiency. As a result, frequency domain partitioning saves bandwidth. Consequently, as a result of the availability of using either temporal domain partitioning or frequency domain partitioning, the exemplary embodiment easily and dynamically adapts to network conditions.

Following the partition of the data into multiple streams, unequal error protection is provided to each of the streams. Unequal error protection is based upon the premise that certain compression algorithms (such as video compression algorithms) produce bits where each or some of the bits contribute quite differently to the reconstructed data such as reconstructed picture quality. Some bits are more important to picture quality than others. Thus, picture quality is maximized if the important bits are transmitted. In other words, if a network is unable to transmit all of the data, the transmission of the most important bits (rather than the less important bits) positively affects picture quality.

Because some bits are more important than other bits in a stream, the mechanism of unequal error protection was developed. In sum, in unequal error protection, generally the more important bits are provided with the most protection against loss or errors during transmission. Referring to the exemplary embodiment discussed in connection with FIG. 2, unequal error protection is applied to the streams in action 40 by bit planes in a bit of a stream being assigned, respectively, error protection. Some bit planes may be assigned more error protection than others. There may be varying levels of error protection assigned. As yet another alternative, each bit plane may be assigned a different level of error protection with respect to each of the other bit planes in the bit.

An advantage of unequal error protection is that it saves bandwidth. Without unequal error protection, equal levels of error protection may be assigned to each bit plane in the bit. But not all bit planes are equal. For example, because it is important that the most important bit planes be protected to insure the quality of the reconstructed data, the most important bit planes are accorded a high level of error protection.

A high level of protection involves extra information, code, etc. which uses extra bandwidth. Without unequal error protection, the same level of error protection as provided to the most important bit planes is accorded to the less important bits. As a consequence, additional extra bandwidth is used. The additional extra bandwidth used in connection with providing the less important bits the same level of error protection as the most important bit planes is wasted.

Unequal error protection recognizes that the less important bit-planes may receive less protection without significantly degrading the quality of the reconstructed data. For example, the more important bit plane within a progressive bitstream is typically the first bit-plane. Thus, in this example, the first bit-plane receives a greater amount of redundancy and in turn a greater level of protection from being lost or damaged in the multi-path network.

Additionally, utilizing UEP at the bit-plane level, rather than the data fragment level, significantly reduces the complexity of the UEP algorithm. As a result, the amount of side information transmitted with the bitstreams is also significantly reduced. Side information may be information provided to the decoder or other elements in the network in order to properly manipulate the transmitted data.

In action 42, the multiple bitstreams may be transmitted across the multi-path network. Each bitstream may be transmitted on an independent path within the network. Advantageously, utilizing multiple paths allows for faster transmission. Additionally, it is unlikely that all of the paths will experience a high level of disruption or congestion and errors in one path do not affect the bitstreams in another path. Thus, information from bitstreams with less missing bit planes may be utilized at a later time to estimate missing bit planes from other bitstreams.

After being transmitted across the multi-path network, the bitstreams are decoded in action 44. The bitstreams may be decoded utilizing a wavelet-based decoder. For example, a 3-D SPIHT decoder may be utilized to decode the transmitted bitstreams. Once the bitstreams are decoded, the missing bit planes are estimated by utilizing an error concealment module in action 46.

In the exemplary embodiment, the error concealment module utilizes information from one bitstream to estimate missing bit planes from another bitstream. For example, two bitstreams may have been transmitted across the multi-path network and one bitstream may have encountered a greater level of disruption and error than the other bitstream. Consequently, one bitstream may have lost more information than the other. The error concealment algorithm utilizes information from the bitstream with more information to estimate the missing bit-plane in the other bitstream. The missing bit-plane is estimated so that it minimizes the overall distortion at the receiving end of the network. Once error concealment is complete, the reconstructed video image or visual information is displayed in action 48. After displaying the visual information in action 48, the sequence ends at action 50.

Figure 3:
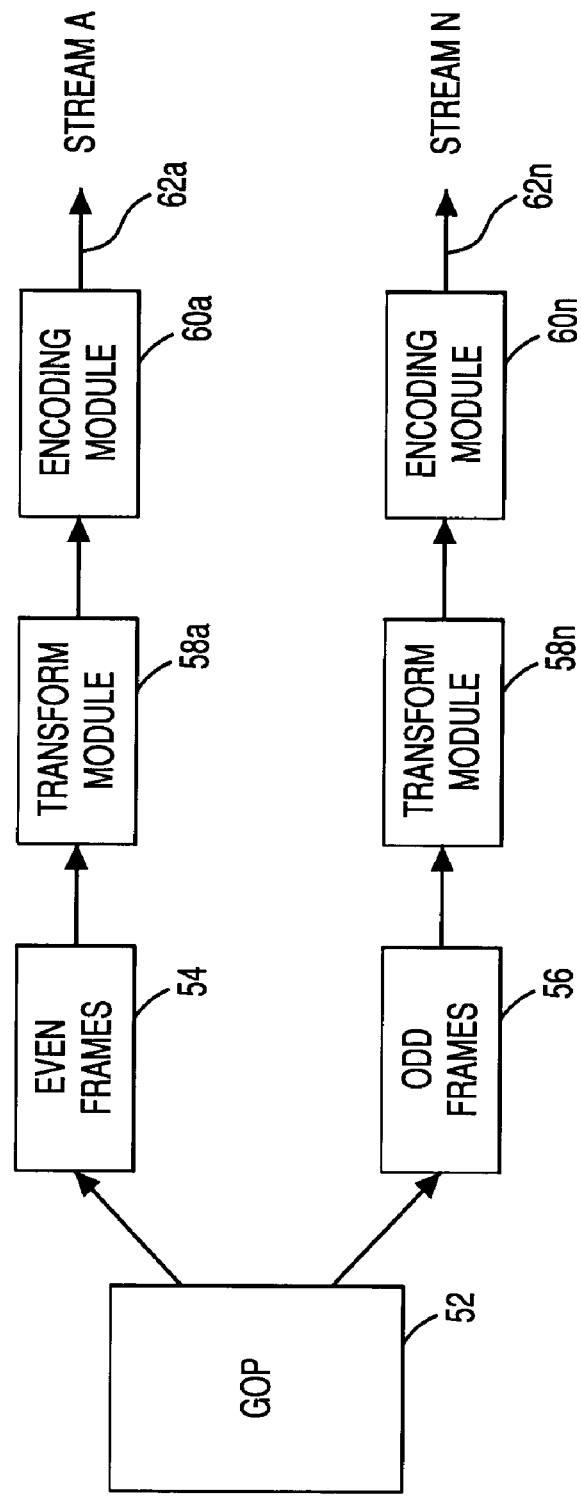
FIG. 3 is a block diagram of an exemplary embodiment of temporal domain partitioning according to the inventions.

An Exemplary Embodiment of Temporal Domain Partitioning—FIG. 3

Now referring to FIG. 3, a block diagram of an exemplary embodiment of temporal domain partitioning is described. Temporal domain partitioning provides optimal results in environments with high packet loss rates. Temporal domain partitioning may be associated with or occur within the source coder. The data such as visual information may be considered as numerous groups of frames or pictures. A group of frames or pictures (GOP) 52 provided by the source may become partitioned into even frames 54 and odd frames 56. The even frames 54 and odd frames 56 may then be transformed in the respective transform modules 58a-n and encoded in the respective encoding modules 60a-n. In an exemplary embodiment of the inventions, the even frames 54 and the odd frames 56 may be transformed to ensure proper wavelet encoding. The encoding modules 60a-n may be wavelet-based encoders such as a 3-D SPIHT coder. Subsequently, each encoder module generates a progressive bitstream. Additionally, the wavelet based coders and decoders allow for easier bit rate adaptation than MPEG based coders and decoders.

For example, in FIG. 3, encoding modules 60a and 60n generate stream A 62a and stream B 62n, respectively. Stream A 62a and stream B 62n are utilized to transmit any video data across the multi-path network. Since the wavelet transform is applied to sub-sampled sequences in the temporal domain, the coding efficiency of the wavelet source coder decreases. Thus, although error-free performance of temporal domain partitioning may be lower than frequency domain partitioning (discussed further in relation to FIG. 4), a stronger correlation between the multiple bitstreams is provided. The stronger correlation is important because error concealment algorithms utilize the correlation between bitstreams to estimate missing bit-planes. Therefore, the error concealment module may be used to improve performance under high packet-loss conditions. Accordingly, the source coder adapts to utilize temporal domain partitioning whenever the network presents high-loss conditions.

An Exemplary Embodiment of Frequency Domain Partitioning—FIG. 4

Turning now to FIG. 4, a block diagram of an exemplary embodiment of frequency domain partitioning is now described. Frequency domain partitioning may be associated with or occur within the source coder. The data such as visual information may be considered as many groups of frames or pictures (GOP). The visual information captured by the source may be transformed by the transform module 70 to ensure proper wavelet encoding. Once transformed, the visual information or the wavelet-transform coefficients in a group of pictures (GOP) 72 may be partitioned into several groups of wavelet coefficients 74a-n (also referred to as a partition of GOP). Each group of wavelet coefficients 74a-n may then be encoded by the encoding module 76a-n to prepare the GOPs for transmission as bitstreams 62a-n. The encoding module may be any wavelet-based encoder such as a 3-D SPIHT coder. For example, in FIG. 4, the wavelet coefficients in a GOP are partitioned into two groups and therefore two substreams are generated for transmission across the multi-path network. Additionally, the wavelet based coders and decoders allow for easier bit rate adaptation that MPEG based coders and decoders.

Unlike temporal domain partitioning, in frequency domain partitioning the wavelet transform is applied prior to the grouping process. Consequently, the correlation between the two bitstreams is weaker than in temporal domain partitioning but the source coding and compression efficiency is increased. However, in low packet loss environments, correlation between bitstreams becomes less important and source coding and compression efficiency gain importance. Bitstream correlation becomes less important in low-loss environments because error concealment, which utilizes bitstream correlation, becomes less of a factor in the quality of the final reconstructed image. Thus, frequency domain partitioning may perform better under low packet-loss conditions because it provides higher source coding and compression efficiency. Additionally, higher source coding and compression efficiency preserves bandwidth.

Figure 5:
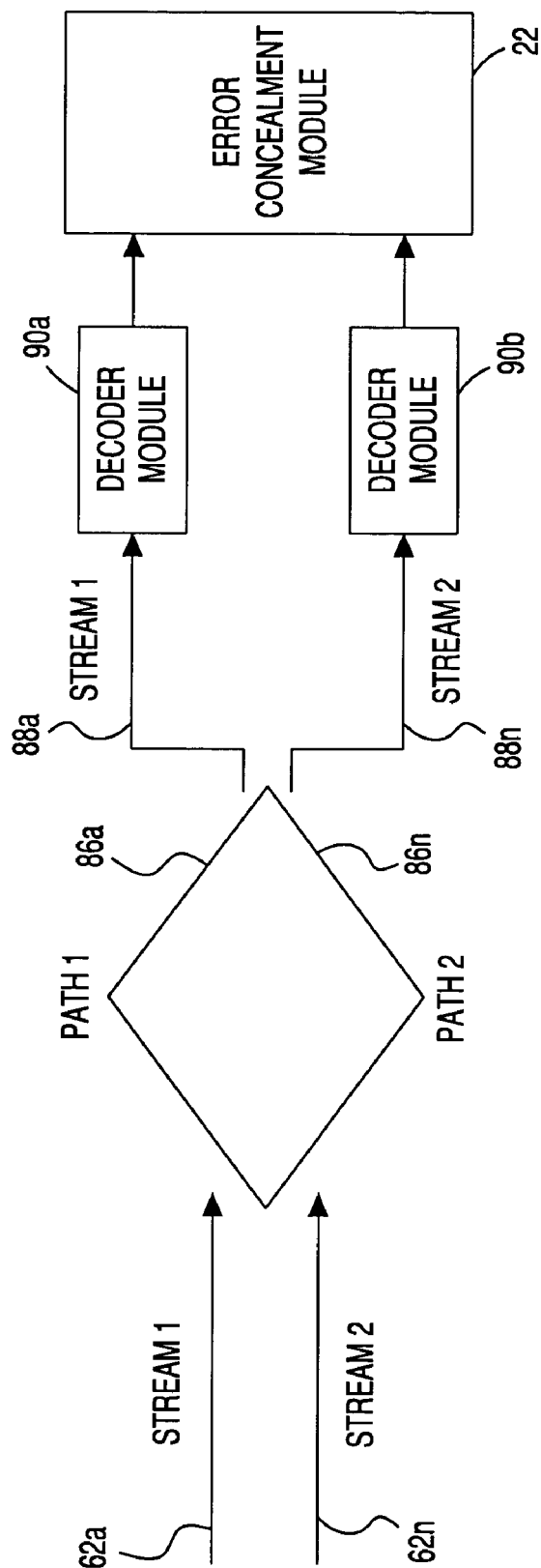
FIG. 5 is a block diagram of an exemplary embodiment of multi-path transport according to the inventions.

An Exemplary Embodiment of Multi-Path Transport—FIG. 5

FIG. 5 illustrates an exemplary embodiment of multi-path transport according to the inventions. Bitstreams 62a-n may be transmitted over the multi-path network 86a-n. A multi-path transmission network is often combined with a multi-substream partitioning. Each substream or bitstream may be transmitted on an independent path. Consequently, errors or congestion in one path do not affect any of the other paths or substreams.

Transmitted bitstreams 88a-n may be decoded by the decoder module 90a-n. The decoder module may be a wavelet-based decoder such as a 3-D SPIHT decoder. Once decoded, the transmitted bitstreams 88a-n may be provided to the error concealment module 22.

An error concealment module utilizes correlation between several bitstreams to estimate missing bit planes from another bitstream. As an example, several temporal domain partitioned bitstreams may have been transmitted across a multi-path network. One bitstream may lose a larger number of bits-planes than the other bitstreams. An error concealment algorithm utilizes the correlation between the bitstreams, and the information within the correlated bitstreams, to estimate the missing bit-plane of a bitstream. The missing bit-plane is estimated so that it minimizes the overall distortion at the receiving end of the network. Once error concealment is complete, the reconstructed video image or visual information is displayed.

CONCLUSION

From the foregoing description of the exemplary embodiments of the inventions and operation thereof, other embodiments will suggest themselves to those skilled in the art. Therefore, the scope of the inventions is to be limited only by the claims below and equivalents thereof.

We claim:

1. A method for streaming data in a network, comprising:
   determining if the network is experiencing a high packet loss;
   if the network is experiencing the high packet loss, then encoding the data into multiple streams by using temporal domain partitioning;
   if the network is not experiencing the high packet loss, then encoding the data into multiple streams by using frequency domain partitioning;
   applying unequal error protection to each of the multiple encoded streams;
   transmitting the multiple encoded streams, respectively, along independent paths to a decoder;
   decoding the multiple transmitted encoded streams, respectively, into decoded streams;
   correcting an error or errors incurred during transmission in at least one of the decoded streams by using information from another one or more of the decoded streams; and
   using the decoded corrected streams to reconstruct the data.

2. The method of claim 1, wherein a stream comprises bits;
   wherein a bit comprises at least an important bit plane and comprises other bit planes; and
   wherein applying the unequal error protection to each of the multiple encoded streams comprises applying more error protection to the important bit plane than the other bit planes.

3. The method of claim 1, wherein a stream comprises bits;
   wherein a bit comprises bit planes;
   wherein the bit planes of a bit are organized in a hierarchy of importance with respect to the bit; and
   wherein applying the unequal error protection to each of the multiple encoded streams comprises applying error protection to the bit planes of the bit in a hierarchical manner corresponding to the hierarchy of importance of the bit planes of the bit.

4. A system for streaming data in a network, comprising:
   a coder for encoding the data into two or more streams;
   an unequal error protection module for applying unequal error protection to each of the encoded streams;
   the network including paths for transmitting, respectively, the two or more encoded streams;
   a decoder for decoding the two or more transmitted encoded streams, respectively, into decoded streams; and
   an error module for correcting an error incurred during transmission in at least one of the decoded streams.

5. The system of claim 4, wherein an encoded stream comprises bits;
   wherein a bit comprises at least an important bit plane and comprises other bit planes; and
   wherein the unequal error protection module applies unequal error protection to each of the encoded streams by applying more error protection to the important bit plane than the other bit planes.

6. The system of claim 4, wherein the error module corrects the error incurred during transmission in the at least one of the decoded streams by correcting the error with information obtained from another of the decoded streams.

7. The system of claim 4, wherein each of the paths comprises a path independent of other paths of the paths.

8. The system of claim 4, further comprising:
   a rate control module for determining if the network is experiencing high packet loss.

9. The system of claim 8, wherein the coder encodes the data into the two or more streams by using temporal domain partitioning if the network is experiencing the high packet loss.

* * * * *